2,957,238
Patented Oct. 25, 1960

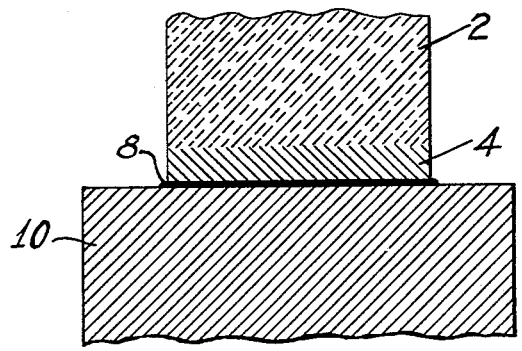
INVENTORS
*Reginald A. Hackley &
Robert L. Harvey*

2,957,238

METHOD OF FORMING A METALLIC SURFACE LAYER ON A FERROSPINEL BODY AND BONDING THE SAME

Robert L. Harvey and Reginald A. Hackley, Princeton, N.J., assignors to Radio Corporation of America, a corporation of Delaware Filed Nov. 18, 1953, Ser. No. 392,848

6 Claims. (Cl. 29—472.9)

This invention relates to methods of forming metallic surface layers on ferrospinel bodies and more particularly to forming such layers integrally united to said bodies.

The coined word ferrospinel is used herein to denote ferro magnetic spinel, which is a species of nonmetallic, cubic, crystalline material containing iron in chemically combined form. The term ferrospinel is appropriate because the materials use chiefly the spin property of unpaired electrons. Ferrospinels are sometimes called ferrites, a term which is also used to denote a form of metallic iron containing a fraction of a percent of carbon. The definition of ferrospinel as defined herein is also defined in the same manner in an article in the RCA Review article (cited below) in a footnote on page 321.

Ferrospinel bodies, also known as ferrites, are well known and have been found especially useful because of their magnetic properties. Ferrospinels are unique crystalline materials of spinel structure which are formed at relatively high temperatures by solid-phase reaction of iron oxide and one or more of other metallic oxides.

Certain ferrospinels exhibit relatively pronounced magnetostrictive properties and are especially useful in transducer devices because of their low eddy current losses and relatively high efficiencies. See, for example, an article in the RCA Review, September 1950, entitled "Ferromagnetic Spinels for Radio Frequencies" pages 321 to 362.

In certain forms of magnetostrictive transducers it is desirable to transfer vibrational energy from a ferrospinel body to another body which is usually metallic. To effect efficient energy transfer it is desirable to provide a rigid, relatively noncompliant connection between the ferrospinel and the metallic bodies.

Difficulty has been encountered in attempting to fasten ferrospinel bodies to metallic bodies. Various cements have been utilized and attempts have been made to solder a ferrospinel body to a metallic member. Cement films, however, tend to fail when subjected to vibrational forces. It has not previously been possible satisfactorily to bond a ferrospinel body to a metallic surface by a solder connection principally because of the difficulty of making solder adhere to the body.

Accordingly one object of the instant invention is to provide a ferrospinel body having a surface layer of a metal integrally united with the body.

Another object is to provide an improved method of producing a metallic surface layer on a ferrospinel body.

Another object is to provide an improved method of fastening ferrospinel bodies to metallic surfaces.

Still another object is to provide an improved method of treating a ferrospinel surface so that it may be readily soldered or welded to a metallic surface.

A still further object is to provide improved methods of soldering ferrospinel bodies.

These and other objects may be accomplished by the practice of the instant invention according to which a surface portion of a ferrospinel body is chemically reduced to provide a metal surface integrally united with the body.

The invention will be described in greater detail with reference to the drawing of which the single figure is a schematic, vertical, cross-sectional view of a ferrospinel body soldered to a metallic base according to the invention.

According to a preferred embodiment of the invention a metallic surface layer may be produced upon the surface of a ferrospinel body as shown in the drawing. A ferrospinel body consisting essentially of $NiFe_2O_4$ is heated for about one minute by a hydrogen torch. The torch is fed with hydrogen only in order to provide an incompletely combusted flame. The temperature of the surface is raised preferably to about 1000° F. The excess hydrogen of the flame reduces a surface portion of the body to a metal which is believed to be an alloy of iron and the other metals of the oxides.

Unexpectedly, the metallic surface portion produced by the reduction is cohesive, relatively smooth and very strongly adherent to the oxide body. Ordinarily it would be expected that a reduction process would produce a granular or flaky, non-adherent layer of metal. It has been found, however, that in the case of a ferrospinel such a reduced surface layer or portion is continuous and inseparably bonded to the ferrospinel body. It is believed that the adherence of the metal to the ferrospinel is at least partially due to an interlocking of the crystalline structures of the respective materials. It is thought that the reduction process, while completed at the surface and for a short distance beneath the surface, extends in an increasingly incomplete form some distance into the ferrospinel composition.

The thickness of the metal surface layer may be readily controlled by varying the time and the temperature of heating as described heretofore. Heating for a longer time or at a hotter temperature or both produces a relatively thick metal layer. Heating for a relatively short time, such as a few seconds, or at a relatively low temperature tends to produce a relatively thin metallic layer.

The practice of the instant invention is equally applicable to produce metallic surface layers on ferrospinel compositions other than the $NiFe_2O_4$ heretofore described. For example, methods exactly similar to those described herein may be utilized to produce a metallic surface layer on bodies of any of the ferrospinel compositions described in the RCA Review article referred to, such as compositions comprising $Fe_2O_3$ in solid solution with $CuO$, $Mn_3O_4$, $ZnO$, $NiO$ and mixtures of these oxides. The method is generally applicable to all ferrospinel materials.

The upper temperature limit that may be conveniently utilized to form the metallic surface layer on a ferrospinel body is primarily determined by the temperature tolerance of the ferrospinel composition. Many ferrospinel bodies, especially relatively large ones, are apt to crack or to break apart when subjected to unbalanced heating such as is produced by heating one surface only. In general, the temperature utilized is preferably not higher than about 1800° F.

The minimum operating temperature is the minimum temperature at which reduction can be made to take place at a reasonably rapid rate, about 750° F. Somewhat higher temperatures are preferred, however, because of the relative increase in speed of reduction and the shorter time required.

In many instances relatively large bodies of ferrospinel composition cannot be readily treated as described heretofore without damage by thermal shock. In these cases, and generally in the cases of ferrospinel bodies having a minimum cross-sectional dimension of ¼" and greater, it has been found more satisfactory and convenient to reduce a surface portion of the body by other means. Such relatively large ferrospinel bodies may be treated according to the invention by heating them uniformly in a hydrogen furnace, that is, in a furnace having means to maintain the body in a hydrogen-rich atmosphere. The ferrospinel may be heated in a hydrogen atmosphere for about one hour at about 1300° F. and allowed to cool in a hydrogen atmosphere. This heating produces a metallic surface layer on the ferrospinel body over all its exposed surface. If it is desired to provide only a portion of the ferrospinel surface with a metallic layer, suitable masking means such as a quartz powder may be applied to the surface of the body. Alternatively, a metallic surface layer may be produced over the entire surface of the body and unwanted portions of the layer may be removed by etching in a dilute acid such as sulphuric or muriatic acid.

Instead of heating the ferrospinel body in the presence of hydrogen the body alternatively may be heated to about the same temperatures in the presence of carbon to produce essentially the same results.

The temperature limitations for this embodiment of the invention are about the same as those heretofore set forth. The time required, however, is somewhat longer. Depending on the temperature and on the desired thickness of the metal layer, furnace heating may be for a few minutes up to two or more hours.

A ferrospinel body having a metallic surface layer produced according to any of the methods heretofore described may be readily soldered to a metallic body as shown in the drawing. A ferrospinel body 2 having a metallic surface layer 4 produced according to the instant invention is securely soldered to a metal base 10 by a solder joint 8. Previously to soldering, the metallic surface layer is preferably buffed or polished using steel wool or any convenient abrasive to produce a bright, smooth finish. Any conventional soldering material and flux suitable for soldering to iron may be used such as silver solder and zinc chloride. In the case of relatively large ferrospinel bodies, however, it is preferred to use a relatively low melting point solder such as a solder composed of 50% tin and 50% lead in order to avoid excessive thermal strains within the bodies which may serve to weaken or even to crack them.

The practice of the instant invention is, of course, not limited to bodies made of ferrospinel compositions having especially pronounced magnetostrictive properties but is equally applicable to all known ferrospinels.

What is claimed is:

1. A method of forming an adhesive, relatively smooth, strongly adherent metallic surface layer on the surface of a substantially completely crystalline, nonmetallic, magnetic ferrospinel body having a cubic crystalline structure and containing iron in chemically combined form comprising the step of chemically reducing a surface portion of said ferrospinel body until said metallic surface layer is formed.

2. The method according to claim 1 in which said reducing step is carried out by exposing said surface portion to the action of an incompletely combusted hydrogen flame sufficiently to heat said portion to about 750° to 1800° F. for at least a few seconds.

3. The method according to claim 1 in which said reducing step is carried out by heating said surface portion in the presence of hydrogen at about 750° to 1800° F.

4. The method according to claim 1 in which said reducing step is carried out by heating said surface portion in the presence of carbon at about 750° to 1800° F.

5. A method for producing a rigid, relatively noncompliant connection between a metallic body and a substantially completely crystalline, nonmetallic, magnetic ferrospinel body having a cubic crystalline structure and containing iron in chemically combined form, said method comprising the steps in the following order: chemically reducing a surface portion of said ferrospinel body until a metallic surface layer is formed thereon, said reducing step being carried out by heating said ferrospinel body to about 750° to 1800° F. for a limited period of time in a reducing environment, cooling said ferrospinel body, and then soldering said metallic surface layer to said metallic body.

6. A method for providing a rigid, relatively non-compliant connection between a metallic body and a substantially completely crystalline, nonmetallic, megnetostrictive ferrospinel body having a cubic crystalline structure and consisting essentially of iron oxide and at least one other metallic oxide in chemically combined form, said method comprising the steps in the following order: chemically reducing a surface portion of said ferrospinel body until a metallic surface layer is formed thereon, said reducing step being carried out by heating said ferrospinel in a hydrogen atmosphere at about 750° to 1800° F. for a limited period of time, cooling said ferrospinel body, and then soldering said metallic surface layer on said ferrospinel body to a surface portion of said metallic body.

References Cited in the file of this patent

UNITED STATES PATENTS

| | | |
|---|---|---|
| 2,010,605 | Miller | Aug. 6, 1935 |
| 2,336,544 | Hopfield | Dec. 14, 1943 |
| 2,390,805 | Merryman | Dec. 11, 1945 |
| 2,431,660 | Gaudenzi | Nov. 25, 1947 |
| 2,436,420 | Clayton | Feb. 24, 1948 |
| 2,454,270 | Braundorff | Nov. 23, 1948 |
| 2,467,046 | Mincieli | Apr. 12, 1949 |
| 2,570,248 | Kelly | Oct. 9, 1951 |
| 2,621,397 | Black | Dec. 16, 1952 |
| 2,643,199 | Hersch | June 23, 1953 |
| 2,688,182 | Dorst | Sept. 7, 1954 |
| 2,780,561 | LaForge | Feb. 5, 1957 |

FOREIGN PATENTS

| | | |
|---|---|---|
| 558,410 | Great Britain | Jan. 4, 1944 |